United States Patent [19]
Bryan

[11] Patent Number: 5,755,480
[45] Date of Patent: May 26, 1998

[54] TRUCK BED EXTENSION

[75] Inventor: Ronnie T. Bryan, West Monroe, La.

[73] Assignee: Tailgator, Inc., Jackson, Miss.

[21] Appl. No.: 803,440

[22] Filed: Feb. 20, 1997

[51] Int. Cl.$^6$ ....................................... B60P 3/40
[52] U.S. Cl. ........................... 296/26; 296/57.1; 224/403; 224/492
[58] Field of Search .................... 296/26, 27, 57.1, 296/37.6; 224/402, 403, 492, 496

[56] References Cited

U.S. PATENT DOCUMENTS

| | | | |
|---|---|---|---|
| 2,556,101 | 6/1951 | Negin et al. | 296/57.1 X |
| 4,472,639 | 9/1984 | Bianchi | 296/26 |
| 4,531,773 | 7/1985 | Smith | 296/26 |
| 4,778,213 | 10/1988 | Palmer | 296/26 |
| 5,154,470 | 10/1992 | Bringman | 296/26 |
| 5,456,511 | 10/1995 | Webber | 296/26 |
| 5,468,038 | 11/1995 | Sauri | 296/57.1 |

Primary Examiner—Dennis H. Pedder
Attorney, Agent, or Firm—John M. Harrison

[57] ABSTRACT

A truck bed extension for pickup trucks, which extension is designed to increase the effective loading capacity of a pickup truck bed and requires no fasteners for mounting. The truck bed extension is characterized by a pair of quick-release cleats and brackets to facilitate rapidly loading and unloading the truck bed extension on the truck tailgate at the rear end of the bed of a pickup truck. In a preferred embodiment the truck bed extension includes a frame having parallel side frame members, each fitted with a cleat for removably engaging corresponding conventional bed brackets provided in the bed of the pickup truck. A pair of tailgate brackets are also welded or otherwise attached to the side frame members, respectively, for engaging the conventional latching pin mechanism attached to the ends of the downwardly-extended, horizontal tailgate of the pickup truck. Inside and outside frame stringers extend between the side frame members, an extension tailgate is hingedly attached to the outside stringer and releasably closes the rear end of the truck bed extension and an optional cover partially or completely closes the truck bed extension.

8 Claims, 2 Drawing Sheets

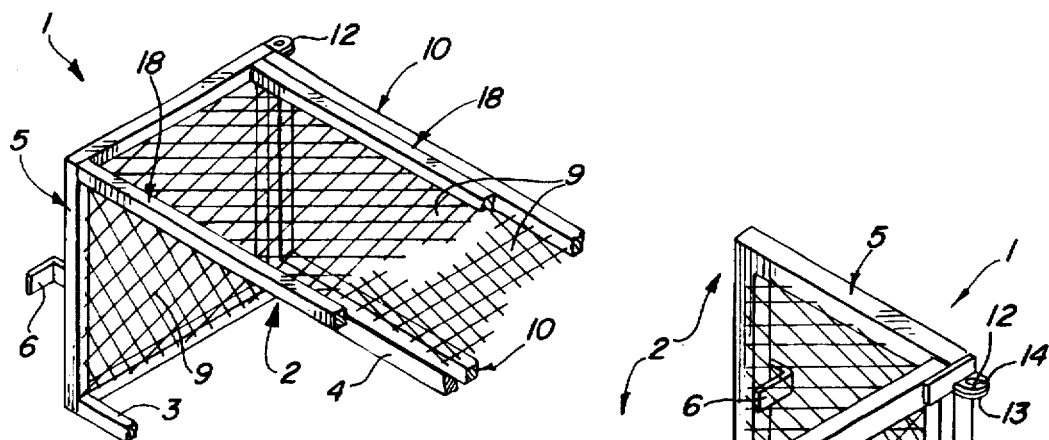
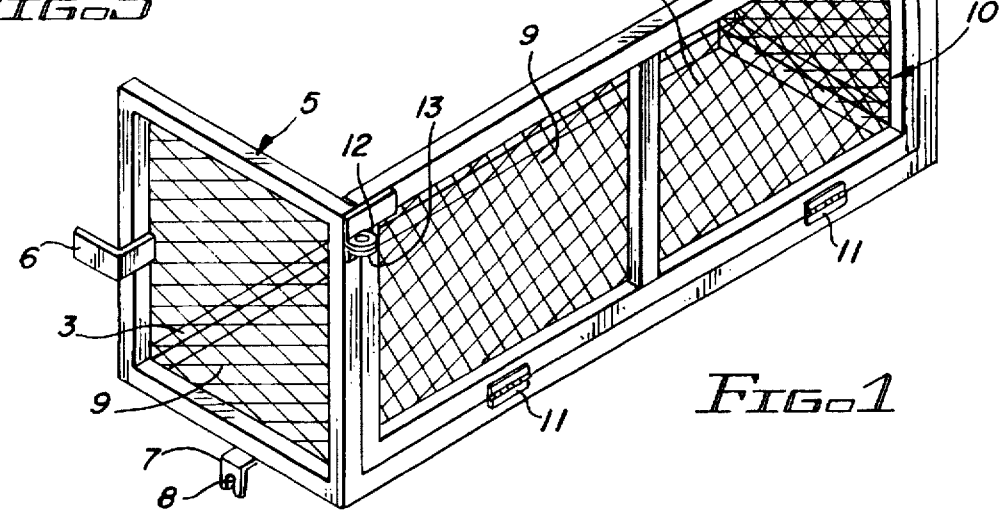
FIG. 1
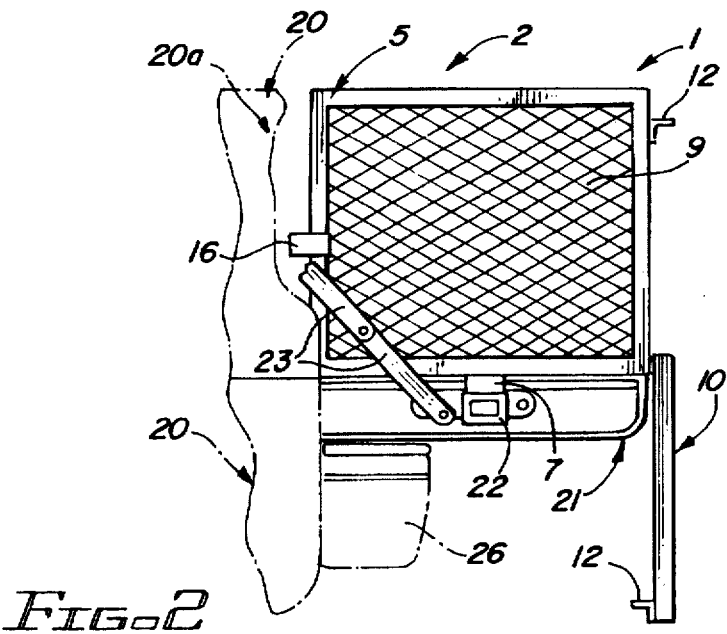
FIG. 2

TRUCK BED EXTENSION

BACKGROUND OF THE INVENTION

Field of the Invention

This invention relates to devices for extending the length of a truck bed and more particularly, to a truck bed extension designed to extend the loading capacity of a truck having a downwardly-extending tailgate, such as a pickup truck. In a preferred embodiment the truck bed extension is characterized by an extension frame having upward-standing side frame members spaced by parallel inside and outside stringers. A cleat is welded or otherwise attached to each of the side frame members and is designed to releasably engage conventional truck bed brackets located in the upward-standing sides of the bed of the pickup truck. Furthermore, a pair of tailgate brackets are attached to the side frame members for extending downwardly and removably engaging the conventional tailgate latching pin mechanisms located on the ends of the downwardly-folded tailgate of the pickup truck. Accordingly, the truck bed extension may be quickly and easily engaged with and removed from the horizontal tailgate of the pickup truck, without the necessity of using screws, bolts or other fasteners. The truck bed extension is further equipped with a hinged extension tailgate which may be optionally locked into position against the extension frame and hingedly folded downwardly for access to the pickup truck bed. In a preferred embodiment of the invention a top or cover is provided on the extension frame to facilitate partial or complete closure of the extension frame, for animal containment.

One of the problems which exists with conventional trucks and pickup trucks having downwardly-folding tailgates, in particular, is that of limited loading or cargo space which can be utilized in the truck bed with the tailgate in the upright position. Faced with this problem, many truck owners have chosen to remove the tailgate to facilitate loading such material as lumber and the like, which may project beyond the rear of the pickup truck and rest not only in the truck bed, but also on the downwardly-extended, horizontal tailgate. However, a problem which results in dropping the tailgate for such purposes, is the possible loss of supplies and equipment loaded in the pickup truck bed during operation of the pickup truck, unless these items are restrained or tied down in some manner. Another problem is a lack of facility for safely carrying animals such as dogs and other pets, since these animals are likely to fall or jump from the truck bed, or they may be injured due to braking and acceleration of the pickup truck.

Various efforts have been made in the prior art to increase the load capacity of trucks using tailgate extensions and attachments. Typical of these devices is the "Tailgate Attachment For Extending The Cargo Space Of Vehicles" detailed in U.S. Pat. No. 4,472,639, dated Sep. 18, 1984, to Bianchi. A retractable extender structure for the tailgate of a pickup truck or other vehicle, enables quick and convenient enlargement of the cargo space of the vehicle when necessary. A back panel and side panel are compactly carried against the inside surface of the closed tailgate when not in use, while remaining pivotable into perpendicular relationship into the open tailgate position to increase cargo space. U.S. Pat. No. 4,531,773, dated Jul. 30, 1985, to Smith, details a foldable container slidably connected to a pair of slide guides adapted to be secured to the opposite sides of a vehicle tailgate. The container includes a bottom bed panel and a rear panel hinged to the bed panel and movable between a stacked position over the bed panel. A pair of side panels are hinged to opposite sides of the rear panel and are movable between a stored position overlying the rear panel and an operative position perpendicularly thereto. Catches and telescoping slide guides are used to allow the various elements of the assembly to move with respect to each other. U.S. Pat. No. 4,778,213, dated Oct. 18, 1988, to Randall J. Palmer, details an "Extendible Vehicle Tailgate Assembly" which includes a pair of side panels to be attached to the main tailgate of the vehicle in positions parallel to one another and for swinging movement with the main tailgate between its open and closed positions. An auxiliary tailgate is also provided and projects upwardly from a rear edge of the main tailgate in the open position of the main tailgate and a hinged structure mounts the auxiliary tailgate for swinging movement relative to the main tailgate and the side panels. U.S. Pat. No. 5,154,470, dated Oct. 13, 1992, to Bringman, Jr., details a "Pickup Truck Tailgate Mounted Cargo Apparatus. The apparatus includes first and second plates oriented at an obtuse angle with respect to each other, with trapezoidal end walls. Third and fourth end walls are hingedly mounted to the first and second end walls and are secured to the interior surface of the pickup truck bed. A latch mechanism is characterized by multiple draw bars arranged for projection through the respective first and second end walls for latching of the apparatus during non-use. U.S. Pat. No. 5,456,511, dated Oct. 10, 1995, to Webber, details a "Truck Bed Extender". The extender includes a frame formed of a pair of opposed and spaced frame elements, with each frame element adapted to be coupled to the opposite sidewalls of the bed of a truck. A generally U-shaped and elongated extender pan is disposed between the frame elements and is positioned within the bed of the truck. An extender tailgate is hingedly secured to the extender pan and a roller mechanism is located between the extender pan and the frame for allowing extension of the extender pan from the bed of a truck. U.S. Pat. No. 5,468,038, dated Nov. 21, 1995, to Sauri, details "Multiple Configuration Tailgate Extenders". The device includes an extension member retractably mounted between inner and outer tailgate walls, which extension member is movable between operative and stowed positions. The stowed position of the extension members is substantially entirely enclosed by the tailgate walls. In the operative position, the extension member extends from an opening in the top surface of the tailgate located intermediate the tailgate walls.

It is an object of this invention to provide a new and improved truck bed extension for trucks, which extension is designed to quickly and easily mount on and be removed from the bed of a truck without the use of fasteners.

Another object of this invention is to provide a new and improved truck bed extension for trucks having downwardly-folding, substantially horizontal tailgates, which extension is characterized by an expanded metal or grate-covered frame fitted with cleats and brackets for engaging conventional structural members of the truck to facilitate quick and easy mounting and dismounting of the extension from the truck without the need for screws, bolts or other fasteners.

Yet another object of this invention is to provide a new and improved truck bed extension for pickup trucks having downwardly-extending tailgates, which truck bed extension includes a screened extension frame and optional cover, the extension frame having spaced side frame members and a downwardly-extending hinged extension tailgate, with a pair of cleats and a pair of brackets attached to the side frames, respectively, for engaging conventional corresponding bed brackets and tailgate latching pins of the vehicle truck bed and downwardly-deployed tailgate, respectively.

SUMMARY OF THE INVENTION

These and other objects of the invention are provided in a truck bed extension for mounting in the rear bed area on the downwardly-folding tailgate of a pickup truck, which truck bed extension includes a screened frame fitted with an optional flat or L-shaped, screened top and a downwardly-folding extension tailgate. The truck bed extension further includes a pair of side frame cleats along a vertical edge for engaging cooperating conventional bed brackets in the pickup truck bed and a pair of downwardly-extending tailgate brackets on a horizontal edge for engaging corresponding conventional latching pins located on the ends of the downwardly-folding conventional tailgate, wherein the truck bed extension may be quickly and easily installed on and removed from the pickup truck tailgate without the use of bolts, screws or alternative fasteners of any design.

BRIEF DESCRIPTION OF THE DRAWING

The invention will be better understood by reference to the accompanying drawing, wherein:

FIG. 1 is a perspective view of a preferred embodiment of the truck bed extension of this invention;

FIG. 2 is a side view of the truck bed extension illustrated in FIG. 1, mounted in functional position on a conventional open, downwardly-extended tailgate of a pickup truck;

FIG. 5 is a perspective view, partially in section, of the top portion of the truck bed extension illustrated in FIG. 1, more particularly illustrating an optional flat cover provided thereon.

DESCRIPTION OF THE PREFERRED EMBODIMENTS

Figure 3:
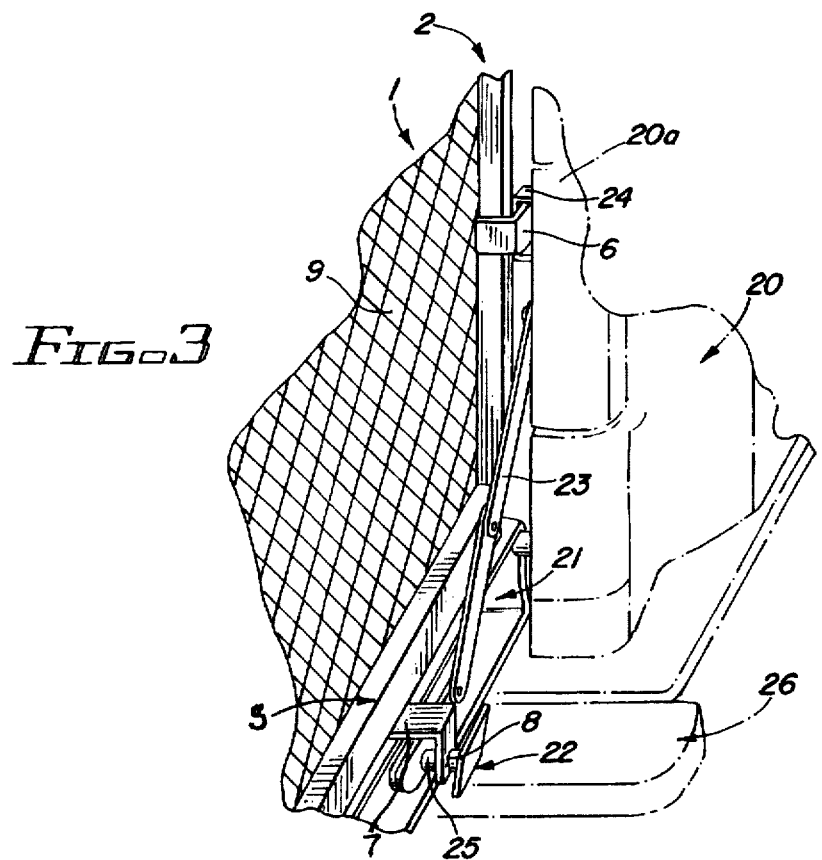
FIG. 3 is a perspective view, partially in section, of one side of the truck bed extension illustrated in FIG. 1, more particularly illustrating a preferred cleat and bracket mounting for removably securing the truck bed extension on the truck tailgate.

Referring initially to FIGS. 1–3 of the drawing, the truck bed extension of this invention is generally illustrated by reference numeral 1 and includes a generally rectangular extension frame 2, with one side and the top of the rectangle removed, which open side is facing inwardly of the truck bed 20a of a pickup truck 20, the rear portion of which is illustrated in phantom in FIGS. 2 and 3. An inside stringer 3 and outside stringer 4 of the extension frame 2 are designed to rest in spaced relationship with respect to each other on the existing conventional downwardly-folded tailgate 21 of the pickup truck 20, above the bumper 26, as further illustrated in FIGS. 2 and 3. A pair of side frame members 5 extend upwardly from welded, bolted or alternative attachment to the respective ends of the inside stringer 3 and outside stringer 4. Each of the side frame members 5 is provided with a side frame cleat 6, projecting outwardly from the front edges, respectively, of the side frame members 5 toward the truck bed 20a. Moreover, a pair of tailgate brackets 7 extend downwardly from the bottom edges of the respective side frame members 5, as illustrated in FIGS. 2 and 3. Each of the tailgate brackets 7 is fitted with a U-shaped bracket slot 8, as further illustrated in FIGS. 1 and 3, for engaging the conventional tailgate latching pins 25 of the tailgate latches 22, extending from the ends of the tailgate 21 of the pickup truck 20. In like manner, referring again to FIG. 3 of the drawing, the side frame cleats 6 each slip inside a conventional truck bed bracket 24, provided on the upward-standing sides of the truck bed 20a of the pickup truck 20, in order to removably, yet securely, mount the truck bed extension 1 on the tailgate 21 of the pickup truck 20 without using fasteners, to effectively enlarge the truck bed 20a of the pickup truck 20.

Figure 4:
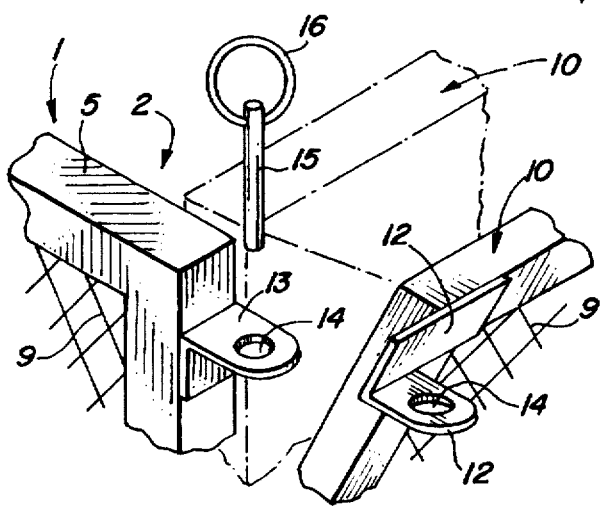
FIG. 4 is a perspective view, partially in section, of a top corner segment of the truck bed extension illustrated in FIG. 1, more particularly illustrating a preferred pin and bracket combination for removably securing the extension tailgate element in the upright position on the extension frame.

Referring now to FIGS. 1 and 4 of the drawings, an extension tailgate 10 is connected to the outside stringer 4 of the extension frame 2 by means of hinges 11 and is provided at the top thereof with a pair of pin brackets 12, that match with corresponding frame brackets 13, attached to the respective outside top edges of the side frame members 5. Accordingly, when the extension tailgate 10 is positioned in the functional, closed configuration illustrated in FIG. 1, the pin openings 14 in the pin brackets 12 and frame brackets 13, respectively, are aligned, in order to receive a pin 15, fitted with a pin ring 16, to maintain the extension tailgate 10 in the upright, closed configuration. Alternatively, when it is desired to fold the extension tailgate 10 downwardly, the pin 15 is removed from the corresponding pin openings 14 in the aligned pin brackets 12 and frame brackets 13 and the extension tailgate 10 is pivoted on the hinges 11 to the open position illustrated in FIG. 2 of the drawing.

It will be appreciated from a consideration of the drawing that all elements of the extension frame 2, including the side frame members 5 and the space between the respective inside stringer 3 and outside stringer 4, as well as the extension tailgate 10, are fitted with a cover, either solid or typically, a screen 9, which may be expanded metal or grate, hardware cloth or an alternative cover or screening, according to the knowledge of those skilled in the art.

Figure 6:
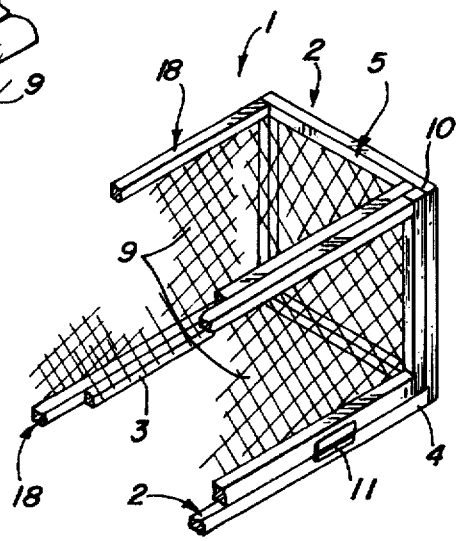
FIG. 6 is a perspective view, partially in section, of one end of the truck bed extension illustrated in FIG. 1, further illustrating an optional L-shaped cover provided thereon.

Referring now to FIGS. 5 and 6 of the drawing, in another preferred embodiment of the invention an extension cover 18 is welded or otherwise fitted to the top edges of the side frame members 5 to close the top of the extension frame 2. It will be appreciated by those skilled in the art that the extension cover 18 may be constructed in a flat, rectangular configuration, as illustrated in FIG. 5, or in a L-shaped configuration, as illustrated in FIG. 6. In the L-shaped configuration the extension cover 18 is designed to cover not only the top of the extension frame 2, but also the open side of the extension frame 2 which faces inwardly of the pickup truck 20. Accordingly, under the latter circumstances the extension frame 2 can be used as an animal containment cage or transport, as desired. Furthermore, it will be appreciated that the extension cover 18, whether provided in the rectangular configuration illustrated in FIG. 5 or in the L-shaped configuration illustrated in FIG. 6 for totally enclosing the extension frame 2, may be secured in position to close the extension frame 2, either partially or totally, by appropriate fasteners, latches or closures well knwon to those skilled in the art.

It will be appreciated from consideration of the drawing and the above description of applicant's invention, that the truck bed extension 1 may be quickly and easily mounted on the existing tailgate 21 of a pickup truck 20, without the use of screws, bolts or other fasteners, as follows: The truck bed extension 1 is initially lifted and the side frame cleats 6 engaged with the corresponding in-place truck bed brackets 24, as illustrated in FIG. 3. This procedure is accomplished while the rear edge of the extension frame 2, including the outside stringer 4, is elevated such that the tailgate brackets 7 each clear the respective tailgate latches 22, mounted on the outside ends of the tailgate 21 of the pickup truck 20. When the side frame cleats 6 are fully engaged with the corresponding truck bed brackets 24, the rear edge of the extension frame 2 is lowered to then seat the bracket slots 8 in the respective tailgate brackets 7 on the corresponding tailgate latching pins 25 of the tailgate latches 22, as further illustrated in FIG. 2. Accordingly, while the truck bed extension 1 is in the configuration illustrated in FIGS. 2 and 3 with the extension frame 2 resting on the tailgate 21 of the pickup truck 20, the truck bed extension 1 cannot be easily dislodged from the tailgate 21, without completely disengaging the respective tailgate brackets 7 from the corresponding tailgate latches 22 and subsequently sliding the side frame cleats 6 from the companion truck bed brackets 24, in a reverse procedure of that illustrated and described above. This reverse procedure is used to remove the truck bed extension 1 from the tailgate 21 of the pickup truck 20, as desired.

It will be appreciated by those skilled in the art that the truck bed extension of this invention is characterized by convenience and flexibility, in that it can be used for a variety of purposes to increase the load capacity of a pickup truck, without the necessity of bolting, screwing or otherwise securing the extension in place. The truck bed extension can also be used to contain animals for transportation purposes with the addition of the L-shaped extension top 18, as heretofore described. Moreover, the truck bed extension 1 can be quickly and easily attached to the pickup truck 20 resting on the tailgate 21 and removed from that position without the necessity of using bolts, screws or other fasteners to secure the truck bed extension in place.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. A truck bed extension for trucks having a bed, a pair of channel-shaped bed brackets provided in the bed, a tailgate for selectively engaging the bed brackets and closing the bed and folding into a horizontal configuration and a pair of tailgate latches having latching pins provided on the folding tailgate, said truck bed extension comprising an extension frame for resting on the tailgate; a screen provided on said extension frame; an extension tailgate hingedly carried by said extension frame for selectively opening and closing on said extension frame; a pair of L-shaped side frame cleats provided on said extension frame for removably engaging the channel-shaped bed brackets in the bed of the truck; and a pair of L-shaped tailgate brackets having a bracket slot provided on said extension frame for removably engaging the latching pins on the tailgate latches on said folding tailgate, whereby said extension frame is removably mounted on the folding tailgate responsive to engagement of said cleats with the bed brackets on the bed and engagement of said tailgate brackets with the tailgate latches on the folding tailgate.

2. The truck bed extension of claim 1 comprising cover means provided on said extension frame for at least partially closing said extension frame and cover screen means provided on said cover means.

3. The truck bed extension of claim 1 comprising frame bracket means provided on said extension frame and extension tailgate bracket means provided on said extension tailgate for selectively engaging said frame bracket means and closing said extension tailgate in said extension frame.

4. The truck bed extension of claim 1 comprising cover means provided on said extension frame for at least partially closing said extension frame; cover screen means provided on said cover means; frame bracket means provided on said extension frame; and extension tailgate bracket means provided on said extension tailgate for selectively engaging said frame bracket means and closing said extension tailgate in said extension frame.

5. In a pickup truck having a bed, a pair of channel-shaped bed brackets provided in the bed, a folding tailgate for selectively engaging the bed brackets and closing the bed and opening into a horizontal configuration and a pair of L-shaped tailgate latches provided on the folding tailgate, the improvement comprising a truck bed extension characterized by an extension frame for resting on the folding tailgate; a screen provided on said extension frame; an extension tailgate hingedly carried by said extension frame for selectively opening and closing said extension frame; a pair of L-shaped side frame cleats provided on said extension frame for removably engaging the channel-shaped bed brackets in the bed of the truck; and a pair of L-shaped tailgate brackets provided on said extension frame for removably engaging the L-shaped tailgate latches on said folding tailgate, whereby said extension frame is removably mounted on the folding tailgate responsive to engagement of said cleats with the bed brackets on the bed and engagement of said tailgate brackets with the tailgate latches on the folding tailgate.

6. The truck bed extension of claim 5 comprising cover means provided on said extension frame for at least partially closing said extension frame and cover screen means provided on said cover means.

7. The truck bed extension of claim 5 comprising a frame bracket provided on said extension frame and an extension tailgate bracket provided on said extension tailgate for selectively engaging said frame bracket and closing said extension tailgate in said extension frame.

8. The truck bed extension of claim 5 comprising cover means provided on said extension frame for at least partially closing said extension frame; a frame bracket provided on said extension frame; and an extension tailgate bracket provided on said extension tailgate for selectively engaging said frame bracket and closing said extension tailgate in said extension frame.

* * * * *